United States Patent
Stallone et al.

(10) Patent No.: US 9,118,233 B2
(45) Date of Patent: Aug. 25, 2015

(54) ELECTRIC MACHINE, INSULATING CAP AND METHOD FOR FORMING AN INSULATING CAP

(75) Inventors: Francesco Stallone, Locarno (CH); Grzegorz Kunka, Krosno (PL); Daniel Hediger, Othmarsingen (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 946 days.

(21) Appl. No.: 13/290,757

(22) Filed: Nov. 7, 2011

(65) Prior Publication Data
US 2012/0112583 A1 May 10, 2012

(30) Foreign Application Priority Data
Nov. 9, 2010 (EP) ..................................... 10461533

(51) Int. Cl.
*H02K 3/38* (2006.01)
*H02K 15/10* (2006.01)
(52) U.S. Cl.
CPC ................ *H02K 3/38* (2013.01); *H02K 15/105* (2013.01); *Y10T 29/49227* (2015.01)
(58) Field of Classification Search
USPC .................... 310/43, 71, 260, 270; 174/138 F, 174/DIG. 20; 264/272.11
See application file for complete search history.

(56) References Cited

U.S. PATENT DOCUMENTS

| | | | | |
|---|---|---|---|---|
| 3,978,359 A | * | 8/1976 | Kultzow et al. | 310/260 |
| 4,309,636 A | * | 1/1982 | Pollok | 310/260 |
| 4,385,254 A | * | 5/1983 | Vakser et al. | 310/260 |
| 4,621,212 A | * | 11/1986 | Torossian et al. | 310/260 |
| 4,768,982 A | * | 9/1988 | Farag et al. | 439/892 |
| 5,093,598 A | * | 3/1992 | Fort | 310/215 |
| 5,142,182 A | * | 8/1992 | Grant | 310/270 |
| 5,298,824 A | | 3/1994 | Franz | |
| 5,334,897 A | | 8/1994 | Ineson et al. | |
| 7,521,828 B2 | * | 4/2009 | Ogawa et al. | 310/71 |
| 7,690,933 B1 | * | 4/2010 | Smith | 439/181 |

FOREIGN PATENT DOCUMENTS

| | | | | | |
|---|---|---|---|---|---|
| DE | 1956628 | * | 5/1971 | | H02K 3/38 |
| DE | 4237079 | * | 5/1984 | | H02K 3/38 |
| DE | 4205168 | * | 3/1993 | | H02K 3/38 |
| DE | 9538631 | * | 1/1997 | | H02K 3/38 |
| EP | 0360623 A2 | | 3/1990 | | |
| EP | 1811632 | * | 7/2007 | | H02K 3/38 |
| JP | 56078343 A | | 6/1981 | | |
| WO | 2006/056542 | * | 6/2006 | | H02K 3/38 |

* cited by examiner

*Primary Examiner* — Burton Mullins
(74) *Attorney, Agent, or Firm* — Buchanan Ingersoll & Rooney

(57) ABSTRACT

The electric machine has a stator with windings connected to phase connections. An insulating cap protects the reciprocally connected portions of the phase connections and windings. The insulating cap has a box-shaped body with an opening for the introduction of a winding within it. The body defines a seat housing the phase connection. The seat is formed in one piece with the body.

15 Claims, 4 Drawing Sheets

Fig. 6
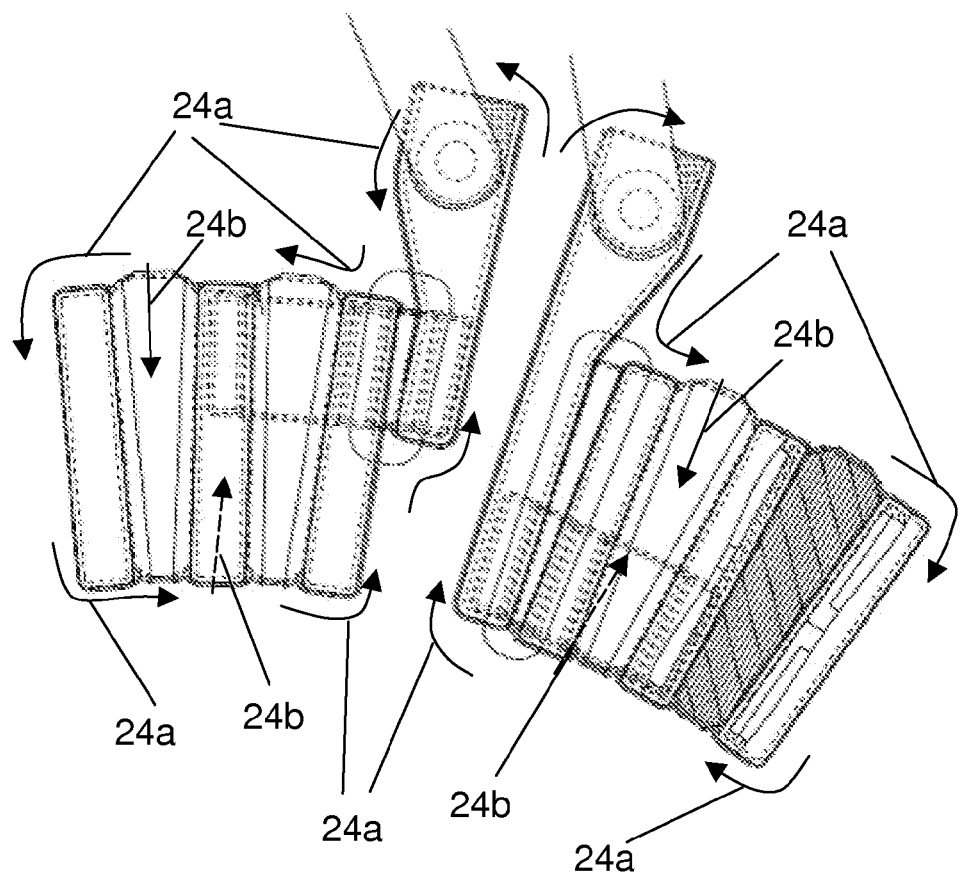
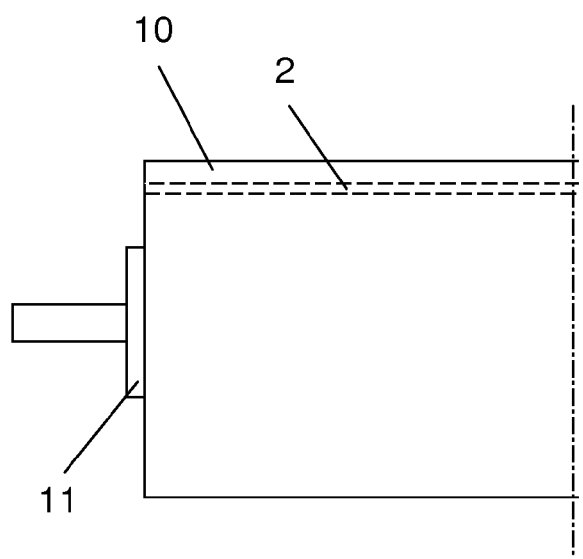
Fig. 7

ELECTRIC MACHINE, INSULATING CAP AND METHOD FOR FORMING AN INSULATING CAP

RELATED APPLICATION

This application claims priority under 35 U.S.C. §119 to European Application No. 10461533.1, filed 9 Nov. 2010, the entirety of which is incorporated by reference herein.

FIELD OF INVENTION

The present disclosure relates to an electric machine, an insulating cap and a method for forming an insulating cap.

BACKGROUND

FIG. 1 shows a traditional connection between windings 2 of a stator of an electric machine such as a generator and phase connections 4 (phase rings).

This connection typically comprises a conductive element 3 brazed at one side to the winding 2 and at the other side to the phase connection 4.

Above the winding 2 end, conductive element 3 and phase connections 4 end an insulating cap 5 is provided to insulate and protect the components housed therein.

As shown, traditional caps 5 are made as two elements; a first element 6 that houses the winding 2 end and the greatest part of the conductive element 3, and a second element 7 that envelopes the phase connection 4 end and has its ends that overlap the borders of the first element 6 at the zones 8.

Putty 9 is also provided within the first and second elements 6, 7 to mechanically fix the cap 5 and electrically insulate the components housed therein.

These caps 5 proved to be very efficient and provide an excellent insulation, but in some cases, their use could be troubling.

In fact, the minimum distance between two adjacent caps 5 must be large enough to avoid discharges (this is the so called electric distance that depends on the materials, voltage, etc).

With the described traditional caps, the minimum distance is much smaller than desirable because of the overlapping of the second parts 7 on the first parts 6 of the caps 5. This causes large constraints in the machine design (for example with reference to the number of slots housing the windings) or maximum voltage achievable.

In addition, an upgrade of a machine such as an electric generator (by increasing the operating voltage) would not be possible, because the upgraded voltage would be too high for the actual distances between adjacent caps 5.

Moreover, assembling of the two pieces 6, 7 of the caps 5 and at the same time the application of putty is typically very time consuming.

SUMMARY

The present disclosure is directed to an electric machine including a stator; a plurality of windings provided on the stator and a phase connection. The phase connection providing at least a portion of an electrical connection between at least two of the plurality of windings. The electric machine also including an insulating cap that electrically insulates an interconnection of said phase connection and a respective one of the at least two windings. The insulating cap has a body portion and a seat, the body portion has an opening that receives a portion of the respective one winding. The seat receives a portion of the phase connection, and is integral with said body portion.

In another aspect, the disclosure is directed to an insulating cap for a rotating electric machine. The insulating cap includes a body portion having an opening configured to receive a portion of a winding of the rotating electric machine; and a seat. The body portion has a first longitudinal side wall, a second longitudinal side wall opposite the first side wall, a third side wall that extends from the first side wall to the second side wall, and an upper wall that extends laterally from the first side wall to the second side wall and that extends longitudinally from the third side wall to the seat. The seat is integrally formed with the body portion and the seat is U-shaped, opening in a direction away from the body portion.

In a further aspect, the disclosure is directed to a method for manufacturing an insulating cap for a rotating electric machine. The method includes removing at least a portion of a first wall of a box-like body so as to define a first open surface that delimits the body. The method also includes removing at least a second portion of a second wall of said body that is adjacent to said first open surface so as to define a second open surface that is adjacent to said first open surface and delimits said body.

The disclosure, in a further aspect, is also directed to an electric machine having a stator with windings connected to phase connections. An insulating cap protecting reciprocally connected portions of the phase connections and windings is provided. The insulating cap having a box-shaped body with an opening for the introduction of a winding within it. The body defines a seat housing the phase connection, and the seat is formed in one piece with the body.

The present disclosure is, in another further aspect, directed to an insulating cap for a rotating electric machine having a box-shaped body with at least one opening. The body defines a seat that is formed in one piece with the body, and the seat is U-shaped having side walls which face away from the body.

In a still further aspect, the disclosure is directed to a method for forming an insulating cap for a rotating electric machine. The method includes, cutting a box-shaped body and removing at least a portion of a first wall and defining a first open surface delimiting the body. The method also includes cutting at least a second portion of a second wall that is adjacent to the first open surface to define a second open surface adjacent to the first open surface and delimiting the body.

BRIEF DESCRIPTION OF THE DRAWINGS

Further characteristics and advantages will be more apparent from the description of a preferred but non-exclusive embodiment of the machine, cap and method illustrated by way of non-limiting example in the accompanying drawings, in which:

FIG. 6 schematically shows a top view of the caps wrapped with a tape; and

FIG. 7 schematically shows a portion of an electric machine such as an electric generator.

DETAILED DESCRIPTION OF THE PREFERRED EMBODIMENTS

Introduction to the Embodiments

Figure 1:
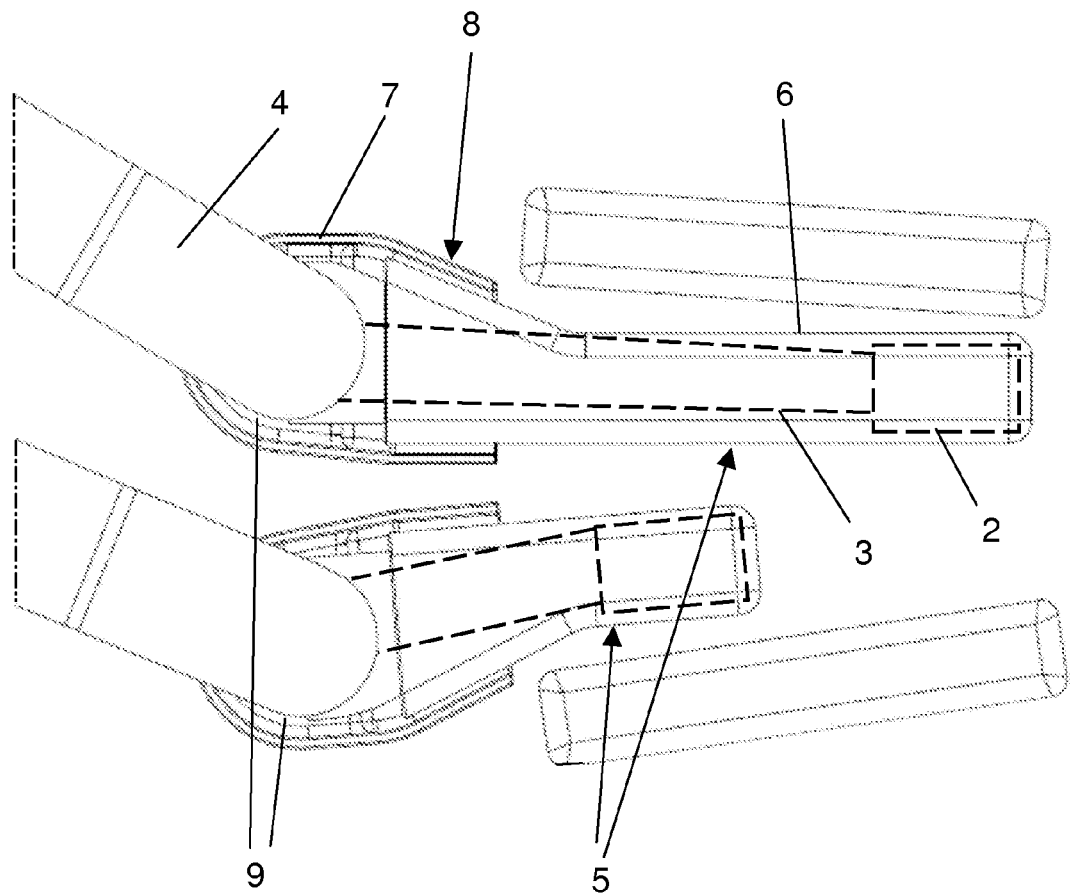
FIG. 1 is a top view of traditional caps.

One of numerous aspects is to provide a machine, a cap and a method allowing an increased distance between adjacent caps, in order to achieve more design flexibility (for example in the number of slots or in the voltage) or improved upgrade possibilities.

Another aspect is to provide a machine, a cap and a method, which permit quicker assembly.

These and further aspects are attained by providing a machine, a cap and a method in accordance with the accompanying claims.

Advantageously, the cap is very robust (more than traditional caps), which allows a simpler wedging between the caps than with traditional caps.

DETAILED DESCRIPTION

In FIGS. 1 through 7 like reference numerals designate identical or corresponding parts throughout the several views.

The electric machine has a stator 10 with windings 2 and a rotor 11. The windings 2 are connected to phase connections 4 via the conductive elements 3.

Figure 2:
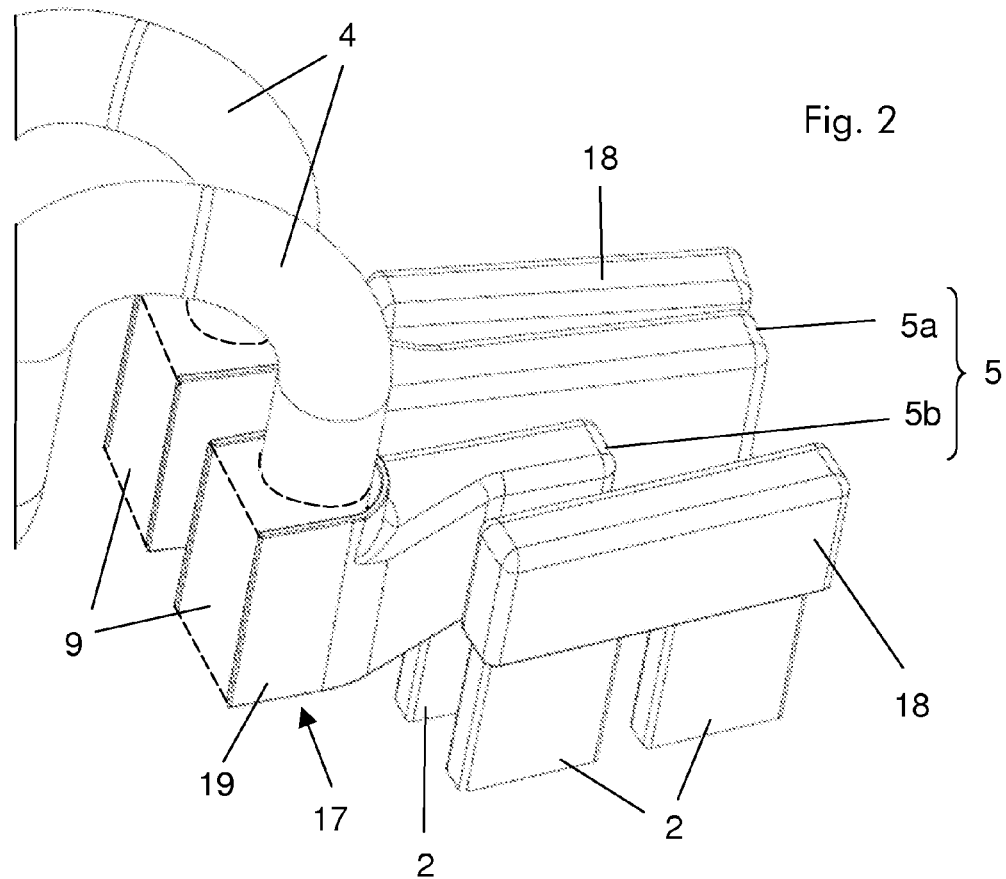
FIGS. 2 and 3 respectively show a perspective view and a top view of caps in an embodiment of the disclosure.
Figure 3:
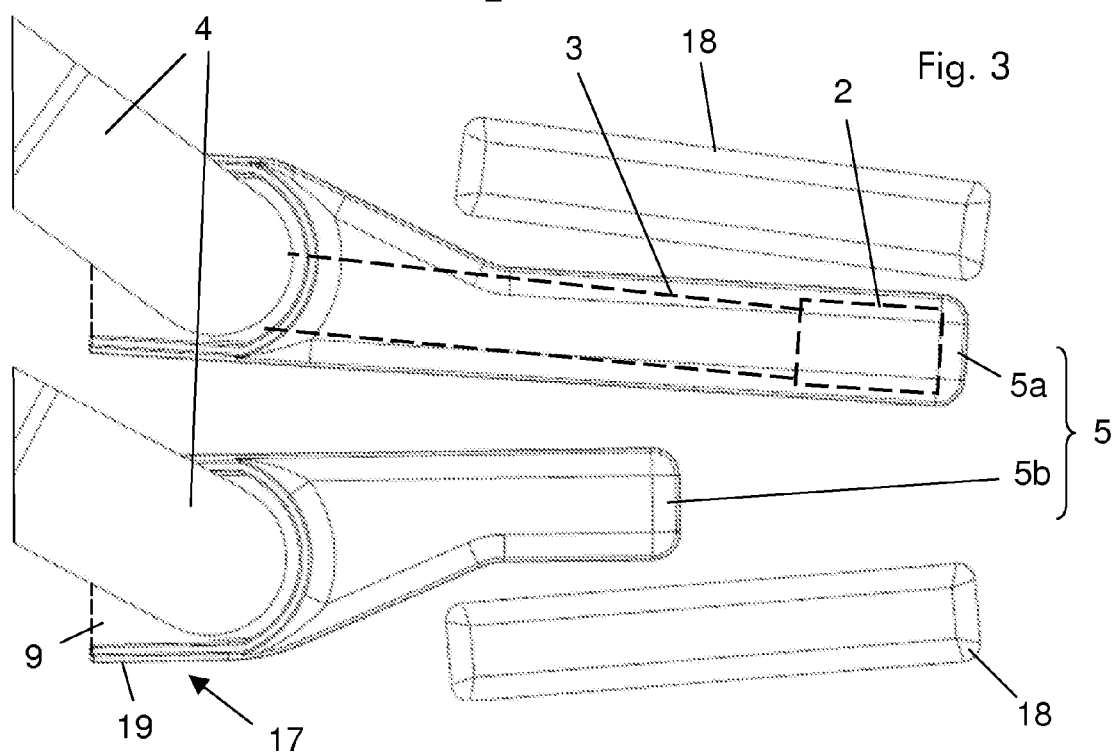

With particular reference to FIGS. 2 and 3, an insulating cap 5 protecting the reciprocally connected portions of the phase connections 4 and windings 2 is provided.

In particular, reference 5a designates the cap provided to insulate the connection between an upper winding within a slot and a phase connection 4; likewise, 5b designates the cap provided to insulate the connection between a bottom winding within the slot and a phase connection 4.

Each insulating cap 5 has a box-shaped body 15 with an opening 16 for the introduction of a winding 2 within it.

In addition, the box-shaped body 15 defines a seat 17 housing the phase connection 4; this seat 17 is realised in one piece with the box-shaped body 15.

In particular, the seat 17 is U-shaped, with the side walls 19 of the U-shaped seat 17 facing away from the body 15.

The seat 17 and the cap 5 are filled with putty 9.

Advantageously, between the winding 2 and the phase connection 4, a conductive element 3 is provided that is fully housed within the cap 5.

In FIGS. 2 and 3, the caps 18 covering, protecting and insulating the reciprocally connected ends of the windings are also shown.

Figures 4, 5:
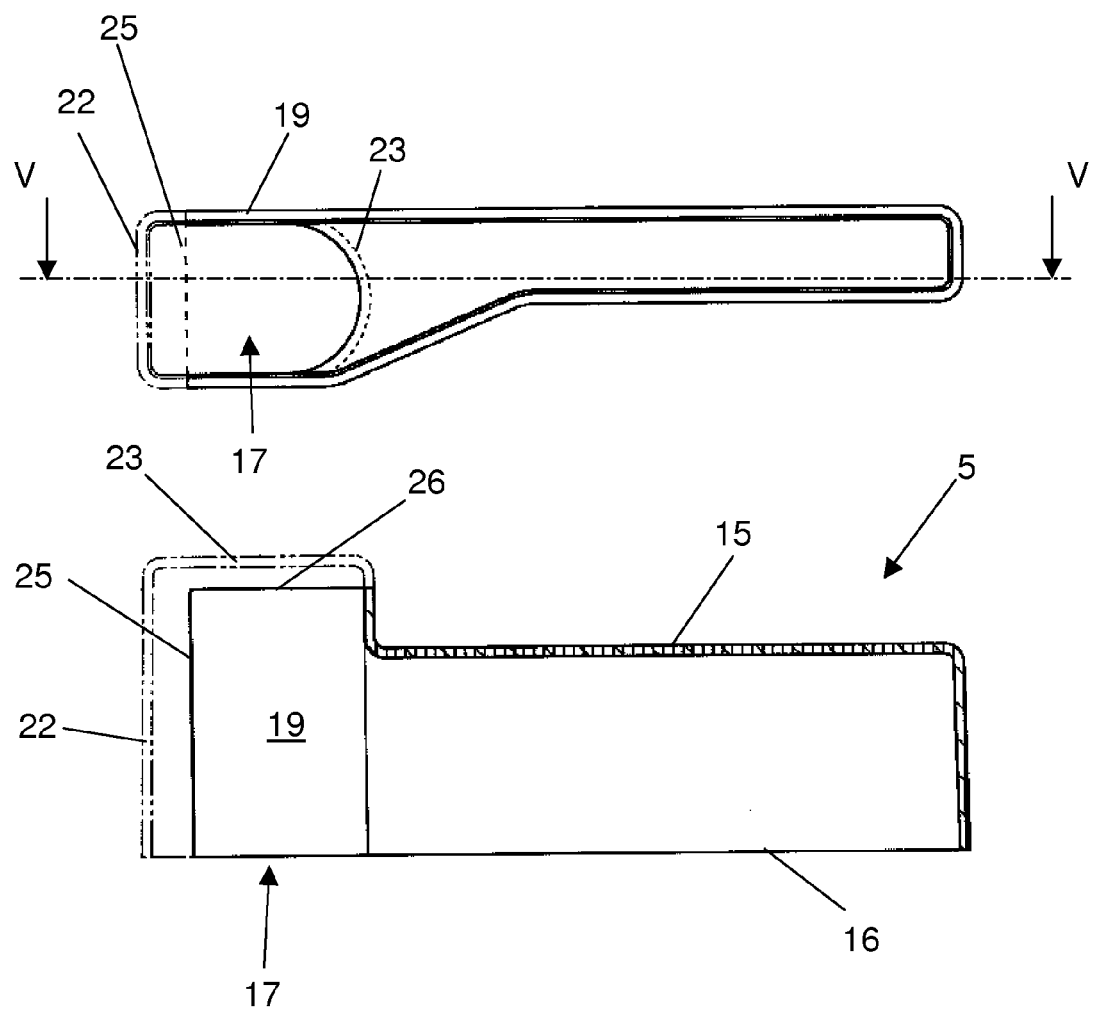
FIGS. 4 and 5 show respectively a bottom view and a cross section through line V-V of FIG. 4 of a cap in an embodiment of the disclosure; in these figures the cap ready to be installed on an electric machine is depicted in solid line and portions of the cap to be cut and removed before it is assembled on the electric machine are depicted in dashed line.

With reference to FIGS. 4 and 5, before it is mounted on the electric machine, the cap 5 has the body 15 with the seat 17 closed by walls 22, 23 depicted in dashed lines.

This structure is used to test the electrical properties of the cap; it is clear that since only one part must be tested for each cap (instead of two like with traditional caps) these tests are quicker.

Then the walls 22 and 23 are cut to form the seat 17 and the caps 5 are mounted by filling them with putty 9 and placed above the winding 2 end, conductive element 3 and phase connection 4 end. It is clear that since only one element must be cut and mounted, assembling is also quicker than with traditional caps.

In addition, as clearly shown in FIG. 3, since the caps have no overlapping zones causing thicker portions, also the minimum distance is sensibly increased, allowing design flexibility, voltage increase and more upgrade possibilities.

Tapes 24a, 24b can be provided; these tapes can be wrapped in the circumferential direction (arrows 24a) and in axial direction (arrows 24b). When provided, these tapes do not substantially alter the distance between adjacent caps 5 (i.e. they are very thin).

The present disclosure also relates to a method for forming an insulating cap 5 for a rotating electric machine comprising the steps of cutting a box-shaped body 15 and removing at least a portion of a first wall 22 to define a first open surface 25 delimiting the body 15.

Advantageously, also at least a second portion of a second wall 23 that is adjacent to the first open surface 25 is cut, to define a second open surface 26 adjacent to the first open surface 25 and delimiting the body 15; the open surfaces 25, 26 allow a U-shaped seat 17 to be defined.

Naturally the features described may be independently provided from one another.

In practice the materials used and the dimensions can be chosen at will according to requirements and to the state of the art.

REFERENCE NUMBERS 2 winding
3 conductive element
4 phase connection
5, 5a, 5b insulating cap
6 first element of 5
7 second element of 5
8 zone of 5
9 putty
10 stator
11 rotor
15 body
16 opening
17 seat
18 cap
19 walls of 17
22 wall of 15 to be removed
23 wall of 15 to be removed
24a, 24b tape
25 open surface of 15
26 open surface of 15

What is claimed is:

1. An insulating cap for a rotating electric machine, said insulating cap comprising:
a body portion having an opening configured to receive a portion of a winding of said rotating electric machine; and
a seat, wherein said body portion has a first longitudinal side wall, a second longitudinal side wall opposite said first side wall, a third side wall that extends from said first side wall to said second side wall, and an upper wall that extends laterally from said first side wall to said second side wall and that extends longitudinally from said third side wall to said seat, said seat is integrally formed with said body portion and said seat is U-shaped, which opens in a direction away from said body portion.

2. The insulating cap of claim 1, wherein said seat comprises a wall portion that extends substantially perpendicular to said upper wall in a direction away from said body portion.

3. An electric machine, comprising:
a stator;
a plurality of windings provided on said stator;

a phase connection, said phase connection providing at least a portion of an electrical connection between at least two of said plurality of windings;

an insulating cap that electrically insulates an interconnection of said phase connection and a respective one of said at least two windings, wherein said insulating cap has a body portion and a seat, said body portion having an opening that receives a portion of said respective one winding, said seat receiving a portion of said phase connection, said seat being integral with said body portion; and wherein said body portion has a first side wall that extends from said respective one winding to said phase connection, a second side wall that extends from said respective one winding to said phase connection, a third side wall that extends from said first side wall to said second side wall, and an upper wall that extends laterally from said first side wall to said second side wall and that extends longitudinally from said third side wall to said seat.

4. The electric machine of claim 2, wherein said seat comprises a wall portion that extends substantially perpendicular to said upper wall in a direction away from said body portion.

5. The electric machine of claim 3, wherein said seat is U-shaped, said U-shaped seat opening in a direction away from said body portion.

6. The electric machine of claim 5, wherein an entire volume of said seat that is not occupied by said phase connection is filled with putty.

7. The electric machine of claim 6, wherein an entirety of said conductive element is located within said insulating cap.

8. The electric machine of claim 3, wherein an entire volume of said insulating cap that is not occupied by said phase connection, said respective one winding and said interconnection is filled with putty.

9. The electric machine of claim 3, wherein said interconnection is a conductive element.

10. An electric including a stator with a plurality of windings connected to respective phase connections, comprising:

an insulating cap for protecting each reciprocally connected phase connection and winding, the insulating cap having a box-shaped body with an opening for the introduction of a winding within it, wherein the body defines a seat housing the phase connection, and the seat is formed in one piece with the body;

wherein the seat is U-shaped, and wherein side walls of the U-shaped seat face away from the body.

11. Electric machine according to claim 10, wherein the seat is filled with putty.

12. Electric machine according to claim 10, wherein the cap is filled with putty.

13. Electric machine according to claim 10, further comprising a conductive element arranged between the winding and the phase connection.

14. Electric machine according to claim 13, wherein the conductive element is fully housed within the cap.

15. Insulating cap for a rotating electric machine including a stator, a plurality of windings provided on said stator, and a phase connection, said phase connection providing at least a portion of an electrical connection between at least two of said plurality of windings, the insulating cap comprising:

a body portion and a seat, said body portion having an opening for receiving a portion of a respective one of said at least two windings, said seat for receiving a portion of said phase connection, said seat being integral with said body portion; and wherein said body portion has a first side wall for extending from said respective one winding to said phase connection, a second side wall for extending from said respective one winding to said phase connection, a third side wall extending from said first side wall to said second side wall, and an upper wall that extends laterally from said first side wall to said second side wall and that extends longitudinally from said third side wall to said seat.

* * * * *